US012761421B2

(12) United States Patent
Kim et al.

(10) Patent No.: US 12,761,421 B2
(45) Date of Patent: Oct. 13, 2026

(54) M BY N WAVELENGTH-SELECTIVE SWITCH

(71) Applicant: InLC Technology Inc., Daejeon (KR)

(72) Inventors: Tae Hwan Kim, Daejeon (KR); Seong Woo Suh, Daejeon (KR)

(73) Assignee: InLC Technology Inc., Daejeon (KR)

(*) Notice: Subject to any disclaimer, the term of this patent is extended or adjusted under 35 U.S.C. 154(b) by 238 days.

(21) Appl. No.: 18/598,225

(22) Filed: Mar. 7, 2024

(65) Prior Publication Data

US 2024/0310583 A1 Sep. 19, 2024

Related U.S. Application Data

(60) Provisional application No. 63/451,880, filed on Mar. 13, 2023.

(51) Int. Cl.

*G02B 6/293* (2006.01)
*G02B 6/35* (2006.01)

(52) U.S. Cl.

CPC ....... *G02B 6/29395* (2013.01); *G02B 6/2938* (2013.01); *G02B 6/356* (2013.01)

(58) Field of Classification Search

None

See application file for complete search history.

(56) References Cited

U.S. PATENT DOCUMENTS

| | | | | |
|---|---|---|---|---|
| 9,654,848 | B2 * | 5/2017 | Frisken | H04Q 11/0003 |
| 9,661,406 | B2 * | 5/2017 | Wagener | H04Q 11/0005 |
| 11,204,470 | B2 | 12/2021 | Suh et al. | G02B 6/3502 |
| 2012/0236216 | A1 * | 9/2012 | Sharma | G02B 26/02 349/196 |
| 2015/0208144 | A1 * | 7/2015 | Holmes | H04Q 11/0003 398/48 |
| 2016/0234574 | A1 * | 8/2016 | Wagener | H04Q 11/0005 |

* cited by examiner

*Primary Examiner* — Jerry Rahll
(74) *Attorney, Agent, or Firm* — Stein IP, LLC

(57) ABSTRACT

An M×N wavelength selective switch (WSS) for an optical communication system includes: a first port array consisting of M ports for emitting/receiving beams, where M is a natural number equal to or greater than 2; a second port array consisting of N ports for emitting/receiving beams, where N is a natural number equal to or greater than 2; a dispersion element configured to split each beam at different angles according to different wavelength components on a dispersion plane; an imaging lens configured to readjust and focus the wavelengths of the beams split by the dispersion element; and a unitary switching element that includes a first switching part and a second switching part, the first and second switching parts being physically combined to form one integral component, the first switching part being configured to steer the beams independently on a switching plane such that angles of the beams are controlled according to wavelengths thereof, the second switching part being configured to steer beams independently on the switching plane such that a desired port in the second port array receives a beam from a corresponding port in the first port array.

13 Claims, 14 Drawing Sheets

Single MxN WSS

Twin M'xN' WSS

M BY N WAVELENGTH-SELECTIVE SWITCH

CROSS-REFERENCE TO RELATED APPLICATIONS

This application is a non-provisional application claiming the benefit of U.S. Provisional Application No. 63/451,880, filed on Mar. 13, 2023, in the U.S. Patent and Trademark Office. All disclosures of the document named above are incorporated herein by reference.

BACKGROUND OF THE INVENTION

1. Field of the Invention

The present invention relates to a wavelength-selective switch (WSS), particularly to an M×N WSS used in an optical communication system.

2. Description of the Related Art

A wavelength-selective switch (WSS) is a key component used in optical communication networks. It is designed to dynamically steer or switch incoming optical signals based on their wavelengths. WSS technology plays a vital role in wavelength-division multiplexing (WDM) systems, which enable the transmission of multiple data channels over a single optical fiber.

The primary function of a WSS is to route or direct individual wavelength channels to specific output ports or paths. This capability plays a significant role in the flexible and efficient utilization of the available optical bandwidth. By selectively switching different wavelengths, WSS devices enable reconfigurable optical add-drop multiplexing (ROADM) systems, which provide the ability to add, drop, or pass through specific wavelengths at network nodes.

In general, WSSs work based on the principle of diffraction and use various optical elements such as gratings, lenses, and mirrors to manipulate the incoming light. One of the core components of a WSS is usually a diffraction grating, which separates the different wavelengths of light spatially. By controlling the angle of the grating, the desired wavelength can be directed to a specific output port.

WSS devices offer several advantages in optical network design. They allow for flexible provisioning of wavelength channels, enabling dynamic reconfiguration of the network to accommodate changing traffic demands. WSS technology facilitates wavelength grooming, where multiple low-utilization channels can be combined into a single high-utilization channel, improving network efficiency. It also enables rapid provisioning and restoration in case of network failures.

Moreover, WSSs significantly implement colorless, directionless, contentionless (CDC) architectures in reconfigurable optical add-drop multiplexer (ROADM) systems. In summary, a WSS is a vital component in optical communication networks that enables dynamic routing and switching of optical signals based on their wavelengths. Its versatility and flexibility contribute to modern optical networks' efficiency, scalability, and reconfigurability.

The background technology of the present application is partly shared with the U.S. Pat. No. 11,204,470, issued Dec. 21, 2021.

SUMMARY OF THE INVENTION

An M×N wavelength selective switch (WSS) for an optical communication system according to an embodiment of the present invention includes: a first port array consisting of M ports for emitting/receiving beams, where M is a natural number equal to or greater than 2; a second port array consisting of N ports for emitting/receiving beams, where N is a natural number equal to or greater than 2; a dispersion element configured to split each beam at different angles according to different wavelength components on a dispersion plane; an imaging lens configured to readjust and focus the wavelengths of the beams split by the dispersion element; and a unitary switching element that includes a first switching part and a second switching part, the first and second switching parts being physically combined to form one integral component, the first switching part being configured to steer the beams independently on a switching plane such that angles of the beams are controlled according to wavelengths thereof, the second switching part being configured to steer beams independently on the switching plane such that a desired port in the second port array receives a beam from a corresponding port in the first port array.

The M×N WSS according to an embodiment of the present invention may further include: a polarization diversity element configured to divide the beams with random polarizations into two polarizations; and an expansion lens configured to expand a size of each of the beams.

The M×N WSS according to an embodiment of the present invention may further include: a beam crossing lens configured to render the beams output therefrom parallel; and a port switching lens configured to switch paths of the beams.

The M×N WSS according to an embodiment of the present invention may further include: a beam parallelizing lens which is a curved optical lens that renders the beams out therefrom parallel, wherein the first switching element is provided between the beam parallelizing lens and the beam switching lens.

In the M×N WSS according to an embodiment of the present invention, the unitary switching element may be a Liquid Crystal on Silicon (LCoS), the first and second switching parts being arranged on a common plane.

The M×N WSS according to an embodiment of the present invention may further include: a plurality of relay lenses provided between the first and second switching elements.

In the M×N WSS according to an embodiment of the present invention, the second switching part may include a first area where an input beam is reflected and a second area where an input beam is transmitted.

In the M×N WSS according to an embodiment of the present invention, the first area may be located at a central position of the second switching element while the second area is located at an off-center position thereof.

The M×N WSS according to an embodiment of the present invention may further include: a path separation element provided on the second switching part and functions as an expansion lens when the beams pass through the imaging lens first.

The M×N WSS according to an embodiment of the present invention may further include: a path separation element provided on the second switching element and includes a plurality of wedge prisms.

In the M×N WSS according to an embodiment of the present invention, the path separation element may include polarization elements.

In the M×N WSS according to an embodiment of the present invention, the second switching element may have at least two different rubbing directions.

In the M×N WSS according to an embodiment of the present invention, the first and second port arrays may be divided into two groups with smaller port counts, one group being functionally independent from the other group, thereby restricting optical switching from one group to another group and functioning as two independent WSSs within one module.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
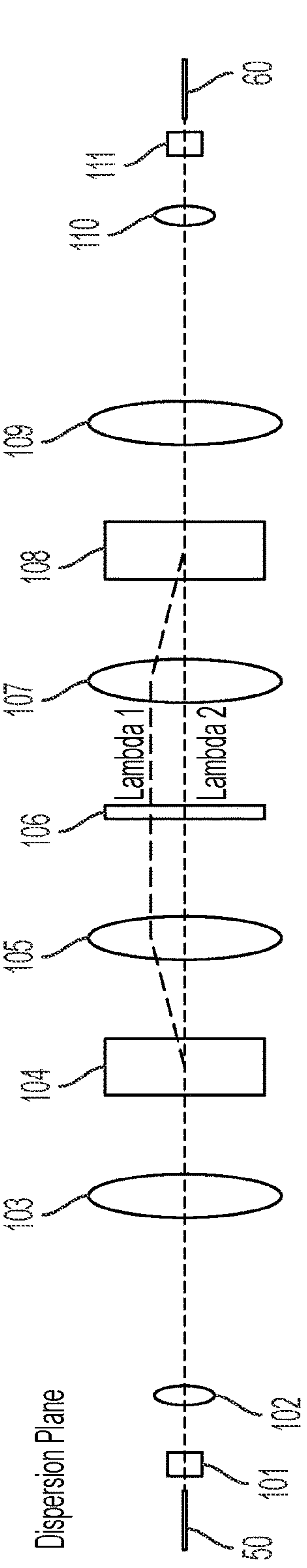
FIG. 1A schematically shows a wavelength-selective switch (WSS) for multiple units on a dispersion plane in accordance with an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1A schematically shows a wavelength-selective switch (WSS) for multiple units on a dispersion plane in accordance with an embodiment of the present invention. The WSS includes a first port array (50), a first polarization diversity element (101), a first expansion lens (102), a second expansion lens (103), a first dispersion element (104), a first imaging lens (105), a first switching element (106), a second imaging lens (107), a second dispersion element (108), a third expansion lens (109), a fourth expansion lens (110), a second polarization diversity element (111), and a second port array (60). This arrangement of components can be modified such that the beam steered from the first switching element (106) passes through the same optics in reverse order. It should be appreciated that some components of the WSS are not illustrated in FIG. 1A for the sake of a simplified articulation of the operations on the dispersion plane.

Now are the operations of the optics of the WSS on the dispersion plane explained with reference to FIG. 1A. On the dispersion plane, a beam with random polarizations emitted from the first port array (50) passes through the first polarization diversity element (101) that could consist of a birefringent crystal (not shown) and a half-wave plate (not shown) and is divided into two beams with the respective polarization. Here, for the convenience of illustration and explanation, only one input beam is shown in FIG. 1A. The size of the beam increases as it passes through the first and second expansion lenses (102, 103). The beam is then separated by wavelength through the first dispersion element (104) which could consist of a diffraction grating (not shown) and a prism (not shown). The beams separated by their wavelengths are incident at different positions on the first switching element (106) on the dispersion axis. This is an independent control of the separated beams according to their wavelength. The beams steered from the first switching element (106) pass through the second imaging lens (107), the second dispersion element (108), the third and fourth expansion lenses (109, 110), and the second polarization diversity element (111) and are incident on the second port array (60). Alternatively, by design, the beams steered from the first switching element (106) may pass through the same optics in reverse order (i.e., through the first imaging lens (105), the first dispersion element (104), the second and first expansion lenses (103, 102), and the first polarization diversity element (101)) and are incident on the second port array (60). Here, the first and second dispersion elements (104, 108) are optical components configured to manipulate the dispersion properties of light, by separating the beams at different angles on the dispersion plane according to the wavelength component. The first and second expansion lenses (102, 103) are a type of optical device designed to enlarge or expand the field of view (FOV) of an imaging system. The first and second imaging lenses (105, 107) are optical components used in redirecting and focusing the light beams separated at different angles for each wavelength by the first dispersion element (104).

Figure 1B:
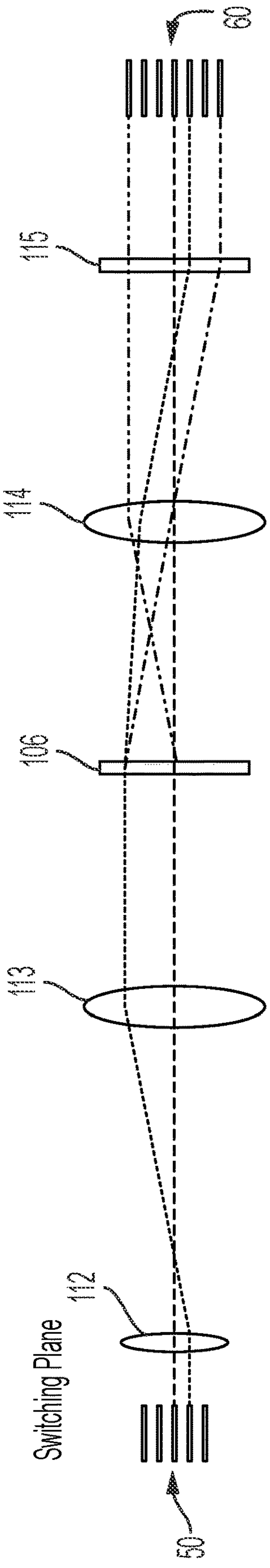
FIG. 1B schematically shows the WSS of FIG. 1A on a switching plane in accordance with an embodiment of the present invention.

FIG. 1B schematically shows the WSS of FIG. 1A on a switching plane in accordance with an embodiment of the present invention. The WSS includes the first port array (50), a beam crossing lens (112), a beam parallelizing lens (113), the first switching element (106), a port switching lens (114), a second switching element (115), and the second port array (60). This arrangement of components can be modified such that the beam steered from the first switching element (106) passes through the same optics in reverse order. It should be appreciated that some components of the WSS are not illustrated in FIG. 1A for the sake of a simplified articulation of the operations on the dispersion plane; and some components of the WSS are not illustrated in FIG. 1B for the sake of a simplified articulation of the operations on the switching plane.

Now are the operations of the optics of the WSS on the switching plane explained with reference to FIG. 1B. On the switching plane, the beam from each port of the first port array (50) converges to a point through the beam crossing lens (112), and then passes through the beam parallelizing lens (113) to enter the first switching element (106). Here, the beams from the first port array (50) are incident at different positions on the first switching element (106) on the switching plane. The first switching element (106) independently steers the beams from each port of the first port array (50) to a desired port in the second port array (60). The port switching lens (114) is provided after the first switching element (106) in the input beam path and before the second port array (60) in the input beam path. The port switching lens (114) is responsible for angling the beam from the first port array (50) toward a desired port of the second port array (60). FIG. 1B shows the occasion of steering a beam to the first port of the second port array (60).

In FIG. 1B, the second switching element (115) steers a beam based on which port in the second port array (60) is to receive a beam from which port in the first port array (50). The first and second port arrays (50, 60) can have a random number of ports, and if the number of ports in the first port array (50) is M (M is a natural number) and the number of ports in the second port array (60) is N (N is a natural number), it is called an M×N WSS. FIG. 1B shows a 5×7 WSS for the sake of simplicity in articulation. Specifically, FIG. 1B shows a situation where a beam with different wavelengths from the third port in the first port array (50) goes to the first and fourth ports in the second port array (60) while a beam with different wavelengths from the fourth port in the first port array (50) goes to the fifth and seventh ports in the second port array (60). A beam with any wavelength from any port in the first port array (50) can be independently controlled and incident at any port in the second port array (60), except when two or more ports in the first port array (50) are set to the same port in the second port array (60). While the description above is for the case of beams going from the first port array (50) to the second port array (60), it is also possible to design a WSS such that beams may go from the second port array (60) to the first port array (50). In this case, it functions as an N×M WSS.

Figures 2A, 2B, 2C:
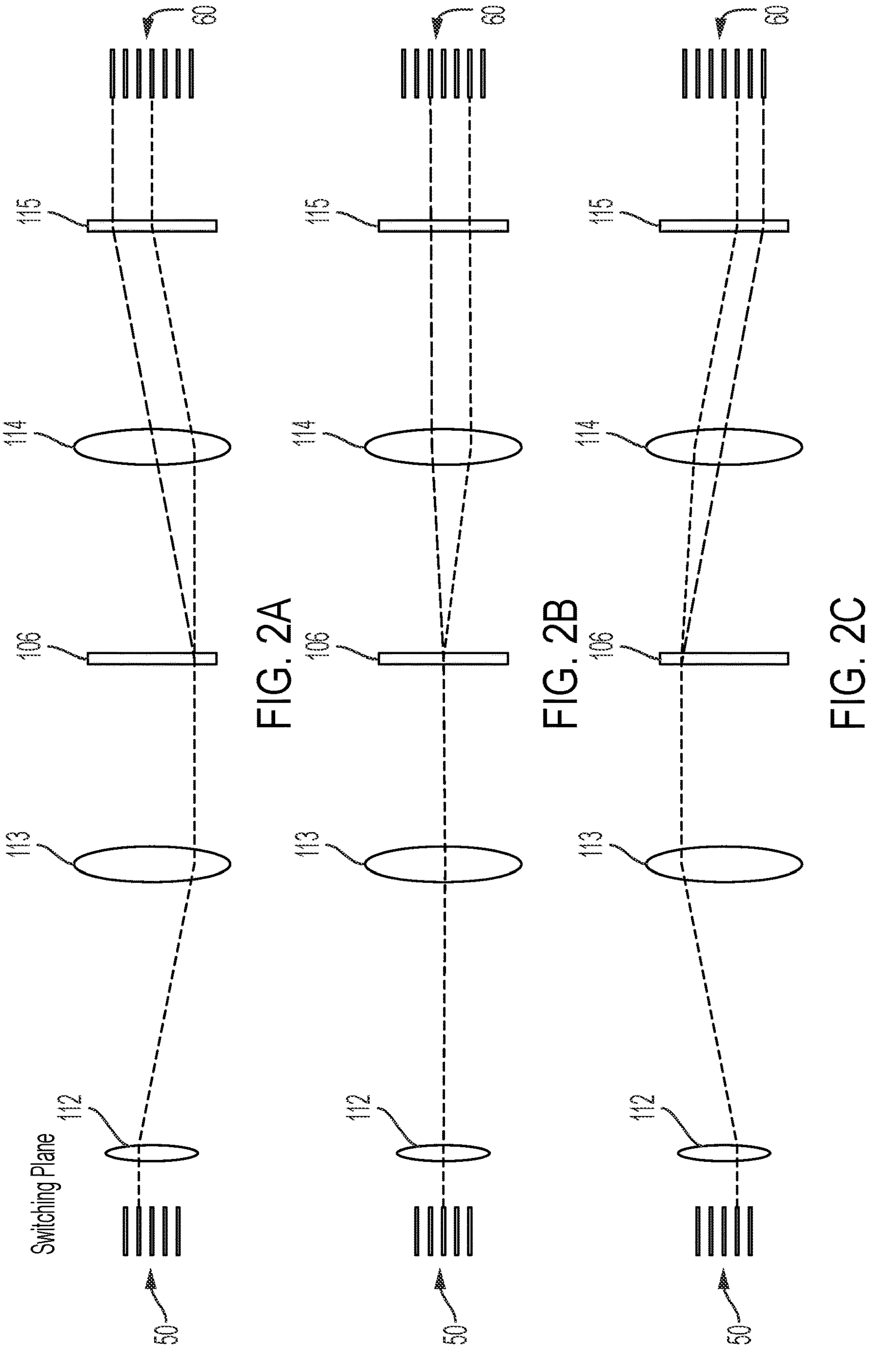
FIG. 2A schematically shows a situation where a beam from the second port in the first port array goes to the first and fourth ports in the second port array on the switching plane in accordance with an embodiment of the present invention.
FIG. 2B schematically shows a situation where a beam from the third port in the first port array goes to the third and sixth ports in the second port array on the switching plane in accordance with an embodiment of the present invention.
FIG. 2C schematically shows a situation where a beam from the fourth port in the first port array goes to the fifth and seventh ports in the second port array on the switching plane in accordance with an embodiment of the present invention.

FIGS. 2A, 2B and 2C illustrate various examples of port configuration on the switching plane in accordance with an embodiment of the present invention. FIG. 2A schematically shows a situation where a beam from the second port in the first port array (50) goes to the first switching element (106) where the beam is split into two beams, each with the same wavelength, traveling to the first and fourth ports in the second port array (60) on the switching plane; FIG. 2B schematically shows a situation where a beam from the third port in the first port array (50) goes to the first switching element (106) where the beam is split into two beams, each with the same wavelength, traveling to the third and sixth ports in the second port array (60) on the switching plane; and FIG. 2C schematically shows a situation where a beam from the fourth port in the first port array (50) goes to the first switching element (106) where the beam is split into two beams, each with the same wavelength, traveling to the fifth and seventh ports in the second port array (60) on the switching plane.

Figure 3B:
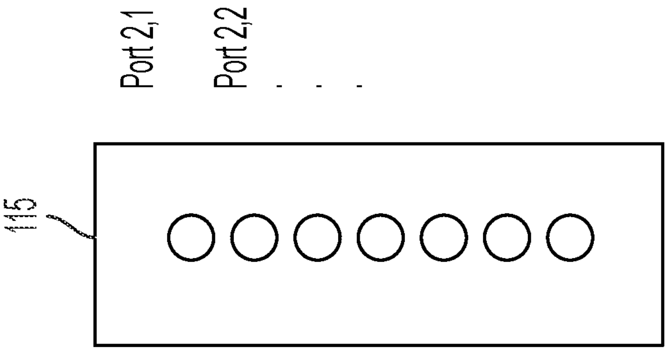
FIG. 3B schematically shows the beam shape at the second switching element in accordance with an embodiment of the present invention.
Figure 3A:
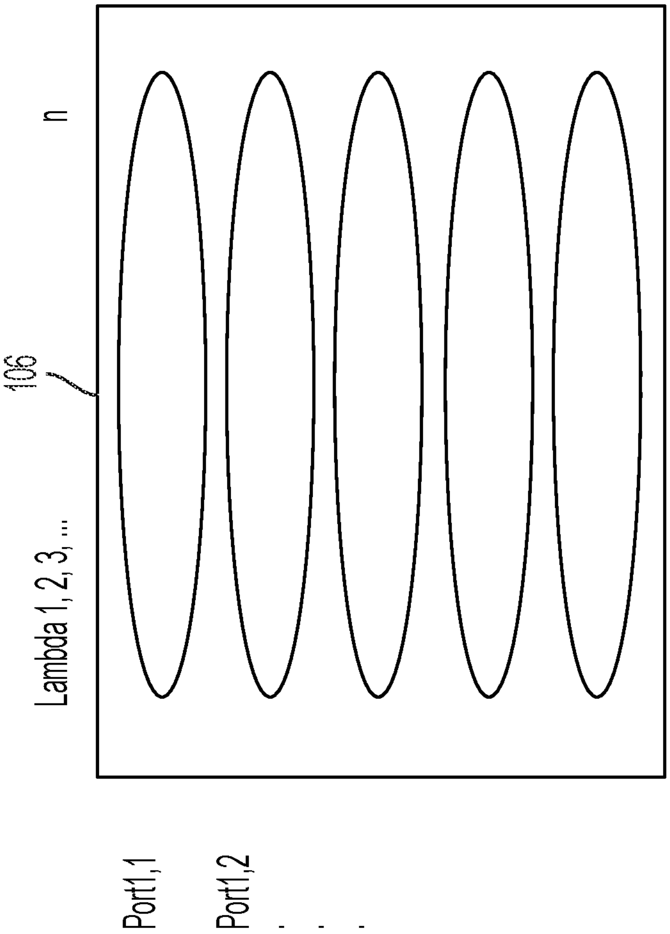
FIG. 3A schematically shows the beam shape at the first switching element in accordance with an embodiment of the present invention.

FIG. 3A schematically shows the beam shape at the first switching element (106) in accordance with an embodiment of the present invention; and FIG. 3B schematically shows the beam shape at the second switching element (115) in accordance with an embodiment of the present invention.

Figure 4A:
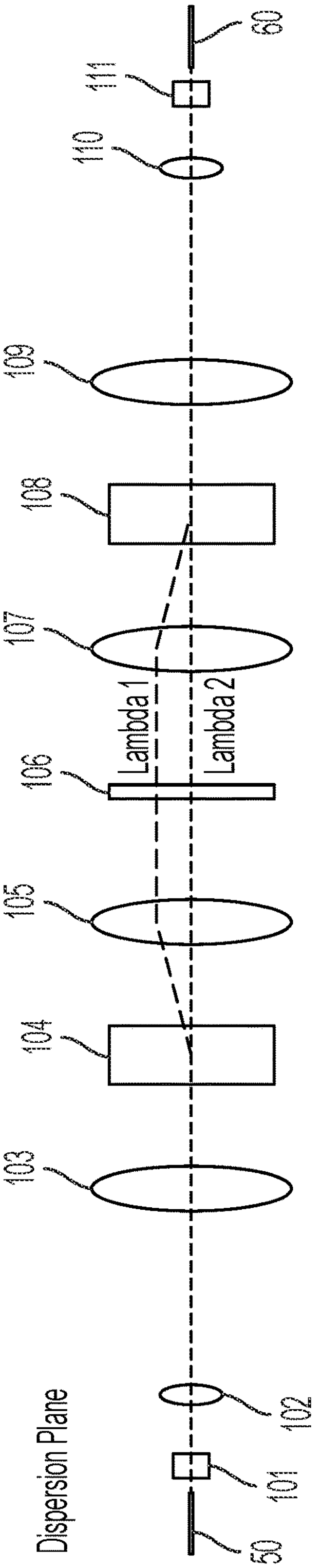
FIG. 4A schematically shows an M×N WSS for multiple units on a dispersion plane in accordance with another embodiment of the present invention.
Figure 4B:
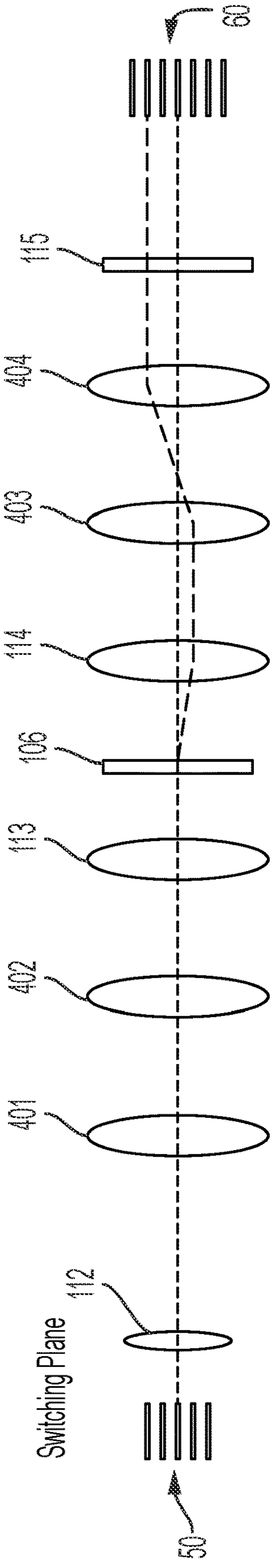
FIG. 4B schematically shows the M×N WSS of FIG. 4A on a switching plane in accordance with the other embodiment of the present invention.

FIGS. 4A and 4B show an M×N WSS in accordance with another embodiment of the present invention. FIG. 4A schematically shows an M×N WSS for multiple units on a dispersion plane in accordance with another embodiment of the present invention; and FIG. 4B schematically shows the M×N WSS of FIG. 4A on a switching plane in accordance with the other embodiment of the present invention.

The overall structures shown in FIGS. 4A and 4B are similar to those illustrated in FIGS. 1A and 1B, with the exception of the relay lenses explicitly illustrated on the switching plane of the WSS. Specifically, as schematically shown in FIG. 4B, the WSS according to this embodiment of the present invention includes a first port array (50), a beam crossing lens (112), a first relay lens (401), a second relay lens (402), a beam parallelizing lens (113), a first switching element (106), a port switching lens (114), a third relay lens (403), a fourth relay lens (404), a second switching element (115), and a second port array (60). This arrangement of components can be modified such that the beam steered from the first switching element (106) passes through the same optics in reverse order. It should be appreciated that some components of the WSS are not illustrated in FIGS. 4A and 4B for the sake of a simplified articulation of the operations on the dispersion and switching planes, respectively.

In the case of FIGS. 1A and 1B, the focal length of the port switching lens (114) is longer than the focal length of the second imaging lens (107). However, if the focal length of the port switching lens (114) is shorter than the focal length of the second imaging lens (107) due to design reasons such as overall beam height, steering angle, etc., at the first switching element (106), the WSS can be configured as shown in FIGS. 4A and 4B.

Figure 5A:
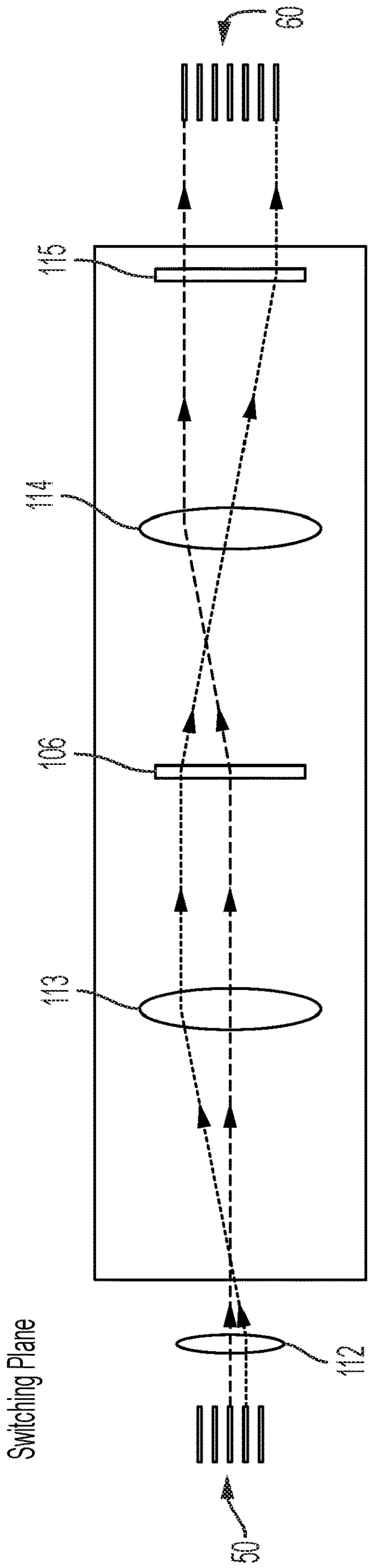
FIG. 5A schematically shows on the switching plane the paths of two beams in the WSS when they don't hit a beam crossing point on the second switching element in accordance with an embodiment of the present invention.
Figure 5C:
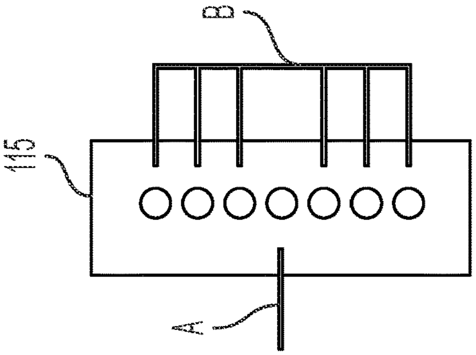
FIG. 5C schematically shows the beam crossing point and other beam transmission positions on the second switching element in accordance with an embodiment of the present invention.
Figure 5B:
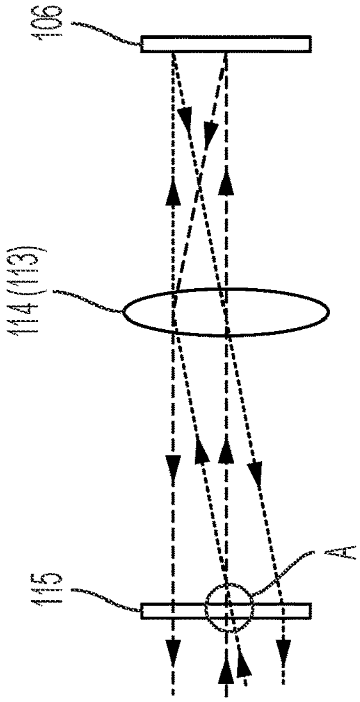
FIG. 5B schematically shows on the switching plane the paths of two beams when they hit the beam crossing point on the second switching element of the WSS of FIG. 5A in accordance with an embodiment of the present invention.

FIGS. 5A, 5B and 5C are schematic illustrations of optical path folding by reflection on the switching plane with respect to the second switching element (115) of the WSS in accordance with an embodiment of the present invention. FIG. 5A schematically shows on the switching plane how two beams propagate in the WSS when they enter beam transmission positions (B) of the second switching element (115) in accordance with an embodiment of the present invention. FIG. 5B schematically shows on the switching plane how two beams travel before and after the first and second switching elements (106, 115) of the WSS of FIG. 5A when they hit a beam crossing point (A) of the second switching element (115) in accordance with an embodiment of the present invention. FIG. 5C is a schematic front view of the second switching element (115) in which the beam crossing point (A) for reflecting beams to travel back to the first port array (50) corresponds to the fourth port of the second port array (60) and a plurality of beam transmission positions (B) for steering beams toward the second port array (60) correspond to the first to third and fifth to seventh ports of the second port array (60).

Reflective optical components such as a Liquid Crystal on Silicon (LCoS) or Micro-Electro-Mechanical Systems (MEMS) may be used as the first and second switching elements (106, 115) of the WSS. In FIG. 5A, two beams output from two ports of the first port array (50) travel toward the second switching element (115) of the WSS and then reach off-center positions, i.e., the beam transmission positions (B), of the second switching element (115). Then, these two beams are output from the second switching element (115) and keep traveling in a direction to two ports of the second port array (60). In this situation, the second port array (60) is located at the focal length of the port switching lens (114), whereby the two input beams traverse the beam transmission positions (B) of the second switching element (115) toward the second port array (60). In contrast, FIG. 5B shows a situation when two traveling beams hit a central position of the second switching element (115). Here, the first of the two beams horizontally hits the central position, i.e., the beam crossing point (A), of the second switching element (115), and is reflected therefrom, keeping its horizontal trajectory all the way through the port switching lens (114) to the first switching element (106) of the WSS. This traveling first beam is then output from the first switching element (106) at an obliquely upward angle toward the beam parallelizing lens (113) and then output therefrom at the horizontal angle in a direction to one port of the first port array (50). Meanwhile, the second of the two beams obliquely hits the first beam crossing point (A) of the second switching element (115) and is reflected therefrom with an oblique angle toward the port switching lens (114). This traveling second beam then passes through the port switching lens (114) and horizontally travels to the first switching element (106). The second beam then passes through the first switching element (106) and is output therefrom at an oblique angle. Once the second beam is output from the first switching element (106), it travels back all the way through the beam parallelizing lens (113) to another port of the first port array (50), with the same oblique angle. As such, the WSS may be designed in such a way that it can reflect the beams hitting the central position (i.e., the beam crossing point (A)) of the second switching element (115) to travel back to the first port array (50) whereas steering other beams hitting off-center positions (i.e., the beam transmission positions (B)) of the second switching element (115) to keep traveling in a direction to the second port array (60). In this situation, the second switching element (115) is located at the focal length of the port switching lens (114), whereby the two input beams hit the beam crossing point (A) of the second switching element (115) and are reflected therefrom toward the first switching element (106). As schematically shown in FIG. 5C, the beam crossing point (A) can be designed to be located at the central position of the second switching element (115) while the beam transmission positions (B) can be located at off-center positions thereof.

As such, the optical components in the WSS may be used in two opposite ways before and after the first switching element (106). The beam parallelizing lens (113) and the port switching lens (114) may be designed identically so that each lens (113, 114) can play both roles. In addition, as described above concerning the beam crossing point (A) in FIGS. 5B and 5C, there is a point on the second switching element (115) where the beams from each port of the first port array (50) intersect. This crossing point (A) acts as a mirror that only reflects the beams, keeping them from further traveling toward the second port array (60), and therefore, a port of the second port array (60) corresponding to this position (A) is not to be used (FIG. 5C). A spatial interference can occur between the first port array (50) and beam crossing lens (112) at the input end and the second port array (60) at the output end, and thus a path separation element may be needed to resolve this issue.

Figure 6:
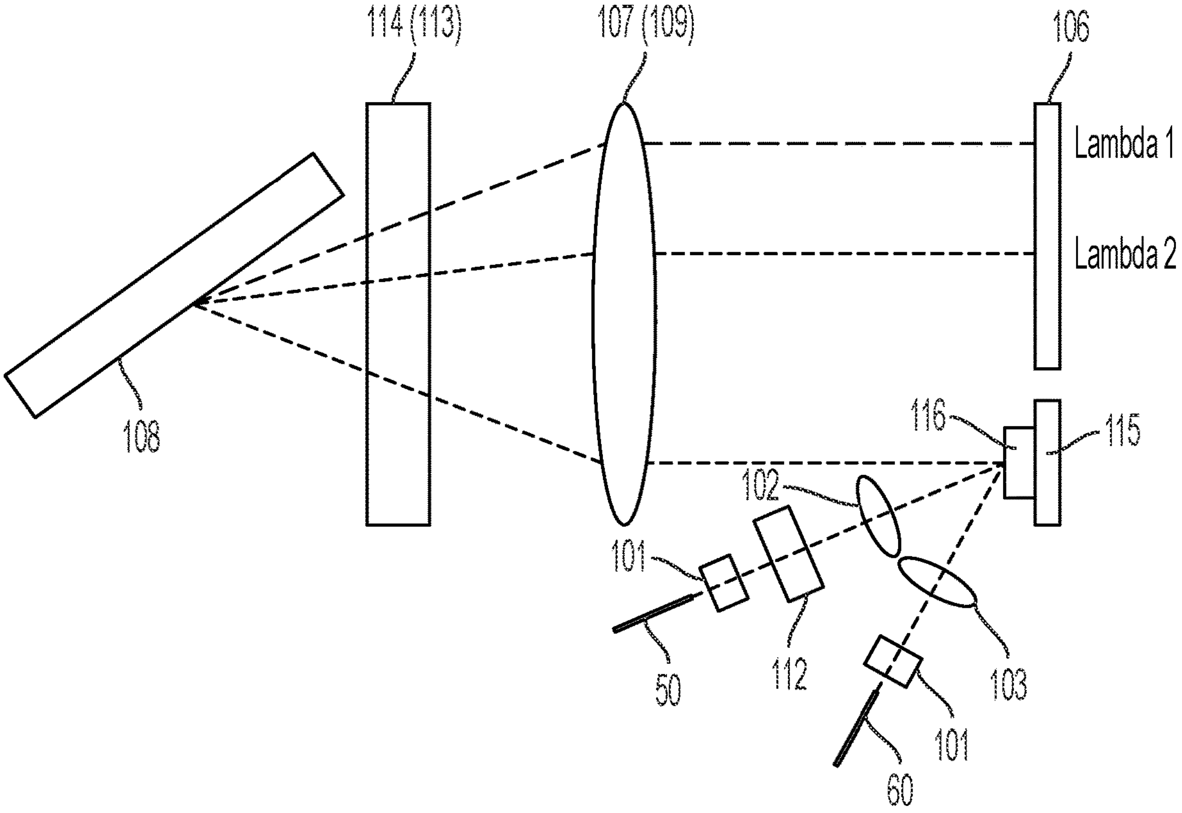
FIG. 6 is a schematic illustration of a WSS structure folded by reflection in a reflective optical component including a path separation element in accordance with an embodiment of the present invention.

FIG. 6 is a schematic illustration of a WSS structure folded by reflection in a reflective optical component including a path separation element (116). It acts as the second expansion lens (109) when the beams pass through the second imaging lens (107) first, and as a beam-parallelizing lens (113) when the beams pass through the port-switching lens (114) first. In other words, the structure illustrated in FIG. 6 is the one shown in FIG. 4 which is folded in half around the first switching element (106) and then folded in half around the dispersion element (108). By using a reflective switching element and a reflective dispersion element, the second imaging lens (107) can be used jointly with the second expansion lens (109), and the port switching lens (114) can be used jointly with the beam parallelizing lens (113). When the beam enters from the first port array (50), the second imaging lens (107) acts as the second expansion lens (109), reflects from the dispersion element (108), and proceeds to the first switching element (106), where it acts as the second imaging lens (107). After reflection from the first switching element (106), they will play the role in the reverse order.

Figure 7A:
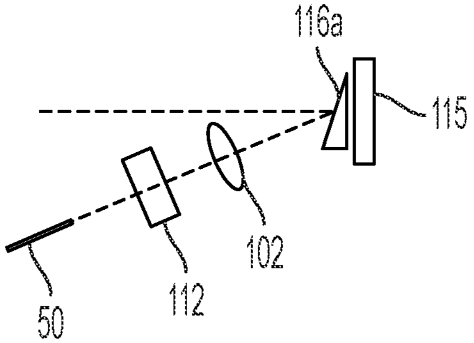
FIGS. 7A, 7B, and 7C schematically show embodiments of a path separation element, which includes a first wedge prism and a second wedge prism in accordance with an embodiment of the present invention.
Figure 7B:
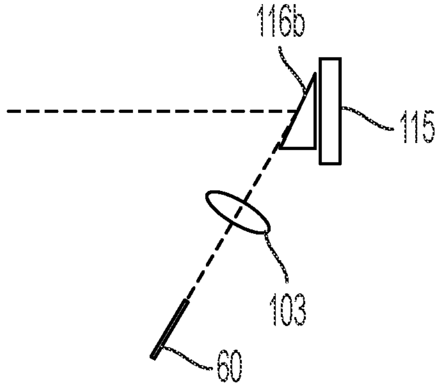
Figure 7C:
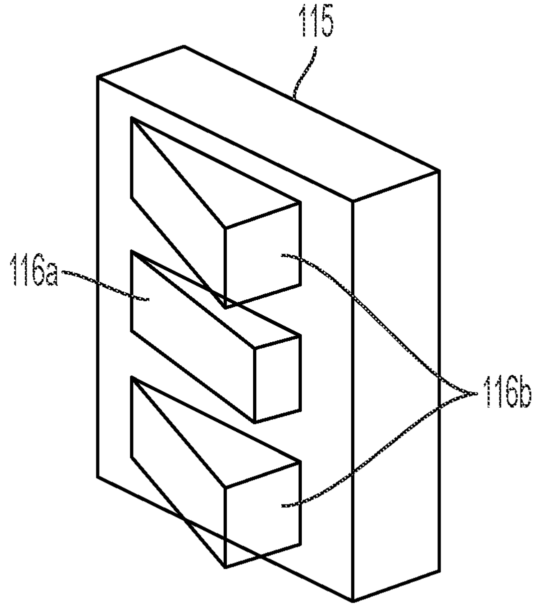

FIGS. 7A, 7B, and 7C schematically show embodiments of a path separation element (116), which includes a first wedge prism (116*a*) and a second wedge prism (116*b*). In FIGS. 7A, 7B, and 7C, the first and second wedge prisms (116*a*, 116*b*) with different angles are placed at the locations on the second switching element (115) where the beams from the first and second port arrays (50, 60) meet to create different paths.

Figure 8:
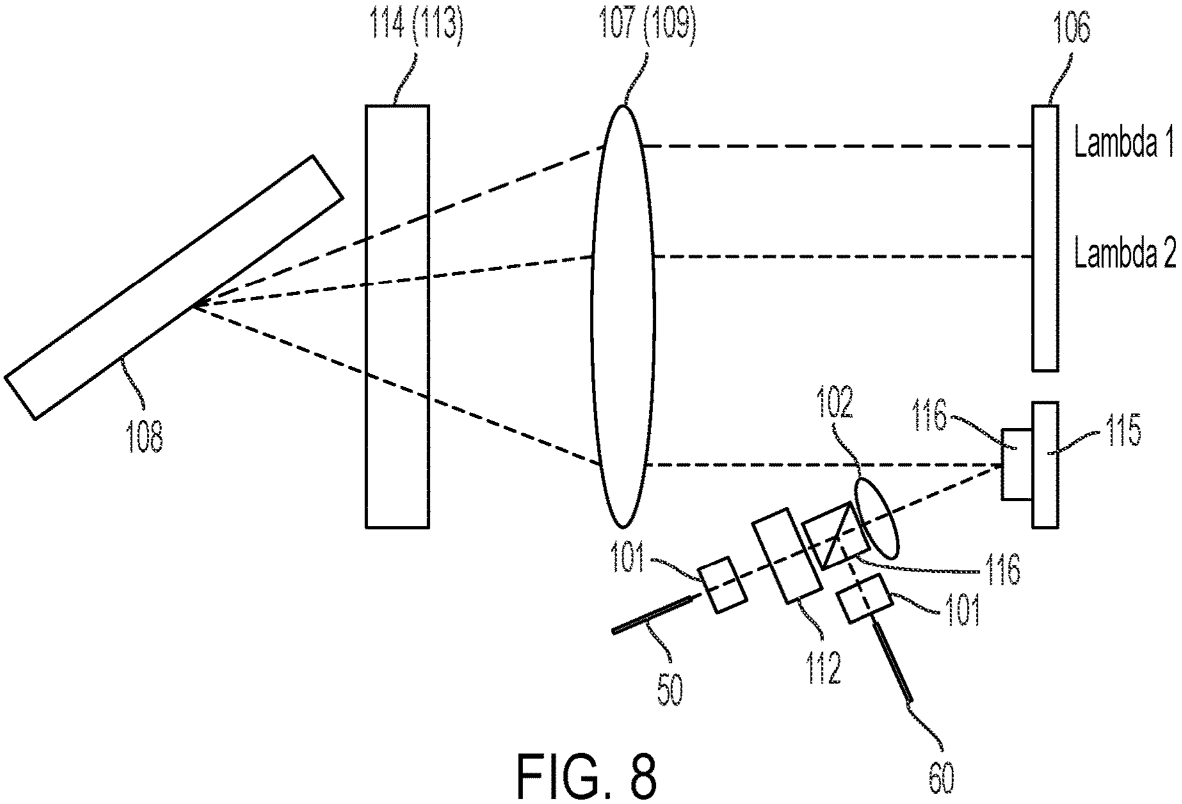
FIG. 8 shows a WSS structure using the path separation element in a different configuration in accordance with an embodiment of the present invention.

FIG. 8 shows a WSS structure using the path separation element (116) in a different configuration. FIG. 8 is a variation of the WSS from FIG. 6 now using a polarizing beam splitter (PBS)(shown in FIG. 9) as the path separation element (116). In the embodiment shown in FIG. 6, the path separation element (116) is located on the second switching element (115) and adjusted by the angle of the wedge prism (116*a*, 116*b*). In contrast, the path separation element (116) shown in FIG. 8 uses polarization of the beam. The rest of the functional parts are the same as in FIG. 6.

Figure 9A:
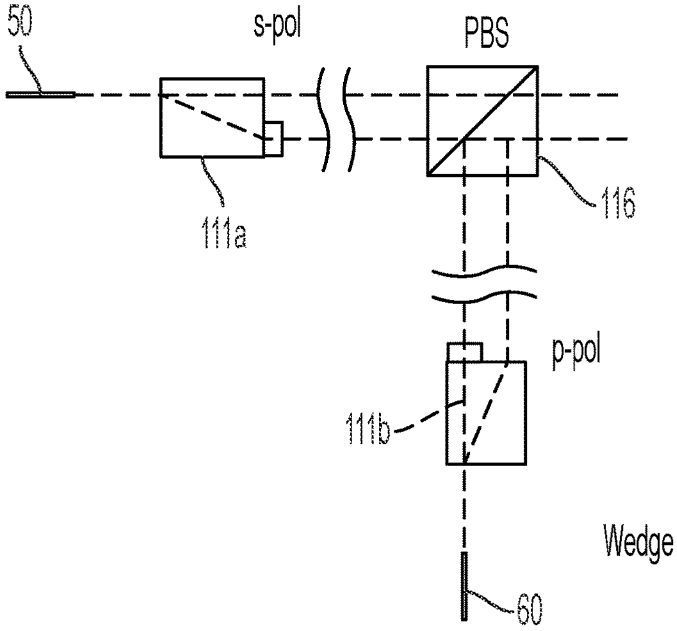
FIGS. 9A and 9B are detailed illustrations of the path separation element of FIG. 8 in accordance with an embodiment of the present invention.
Figure 9B:
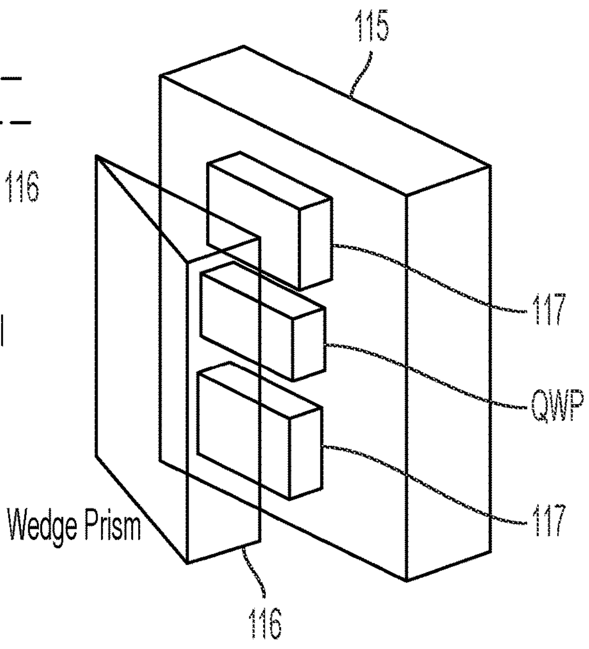

FIGS. 9A and 9B are detailed illustrations of the path separation element (116) of FIG. 8. By configuring the first port array (50) and second port array (60) in such a way that beams have different polarizations (s-pol, p-pol) after passing through their respective polarization diversity elements (111*a*, 111*b*), and the beam paths are merged using polarization optics such as a polarizing beam splitter (PBS). As shown in FIG. 9B, by placing a quarter-wave plate (QWP) on the switching element (115) where the first or second port arrays (50, 60) fit, the corresponding beams from the first and second port arrays (50, 60) have the same polarization for the rest of the optical system. Here, the optical path is compensated by placing glass plates (117) where the beam from a port array (50, 60) other than the one (50, 60) the quarter-wave plate (QWP) fits into.

Figure 10A:
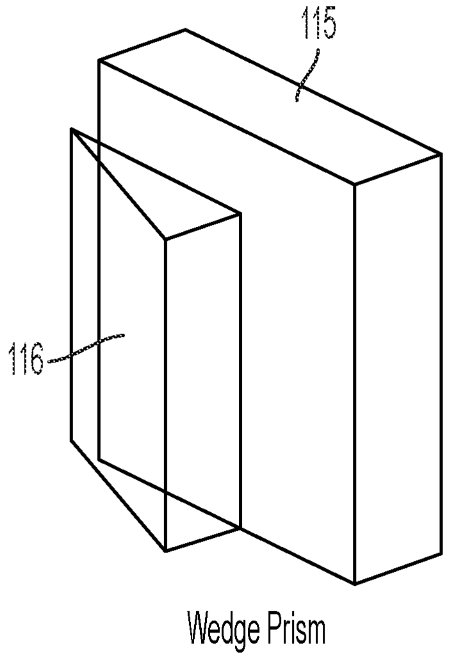
FIGS. 10A and 10B schematically show an additional configuration that is available when configuring the second switching element as a liquid crystal on silicon (LCoS) in accordance with an embodiment of the present invention.
Figure 10B:
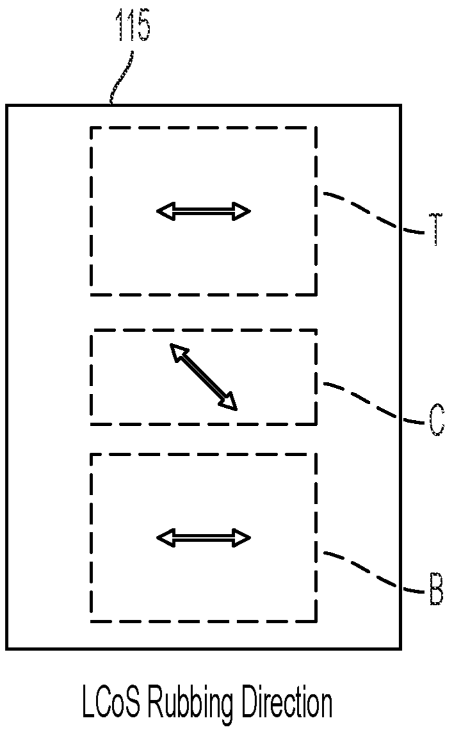

FIGS. 10A and 10B schematically show an additional configuration that is available when configuring the second switching element (115) as a liquid-crystal-on-silicon (LCoS). As shown in FIG. 10B, the rubbing direction in the central area (C) is different from those of the top and bottom areas (T, B) in the LCOS (115). In FIG. 10B, the central area (C) where the beam paths from the first port array (50) meet replaces the quarter-wave plate (QWP) of FIG. 9B used as polarization mode while the need for the glass plates (117) of FIG. 9B is eliminated.

Figure 11:
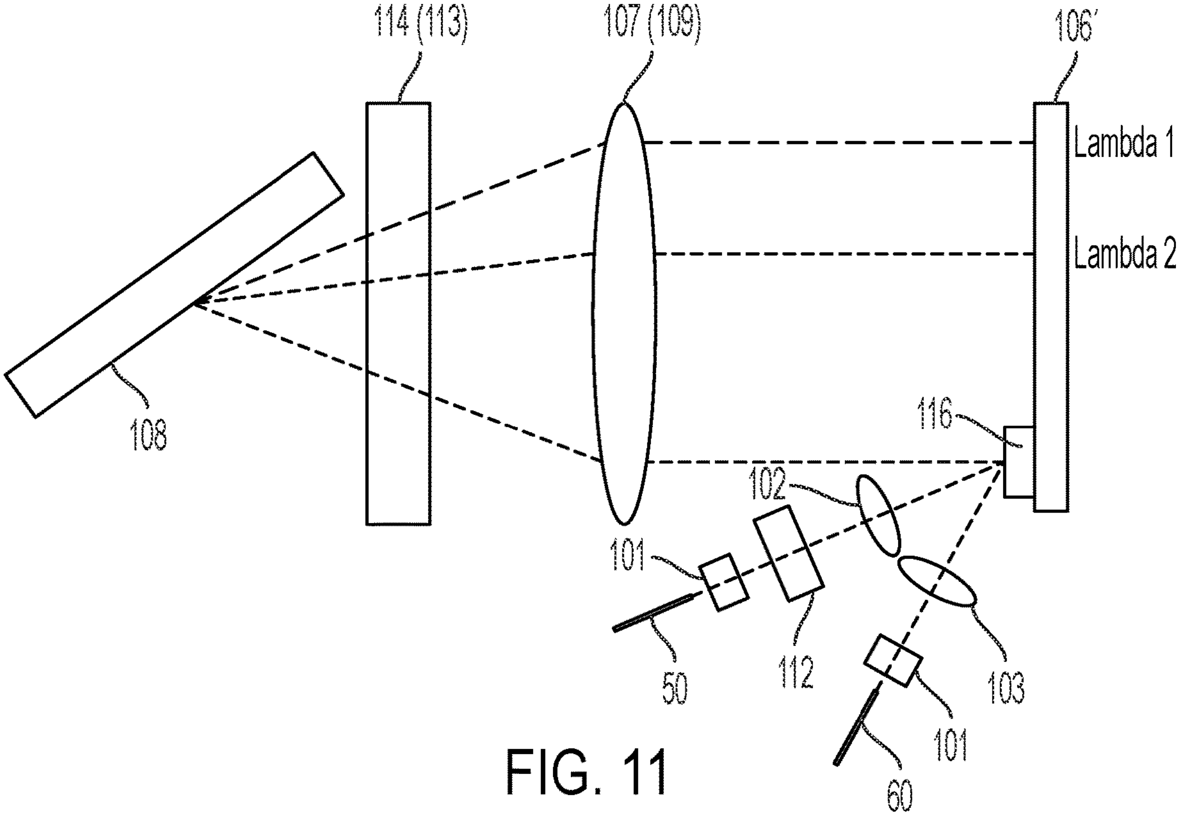
FIG. 11 schematically shows a modified structure to the configuration of FIG. 6 in which a single switching element is used instead of the two separate switching elements as in FIG. 6, in accordance with an embodiment of the present invention.

FIG. 11 schematically shows a modified structure to the configuration of FIG. 6 in which a single switching element is used instead of the two separate switching elements (106, 115) of FIG. 6. In a situation where the first and second switching elements (106, 115) can be arranged on the same plane, a single switching element (106') is used and its area is divided to perform the functions of the first and second switching elements (106, 115). A single switching element according to the embodiment of the present invention allows a compact structure of the WSS product and the reduction of manufacturing cost, thereby realizing an M×N WSS with a high number of optical ports.

Figure 12:
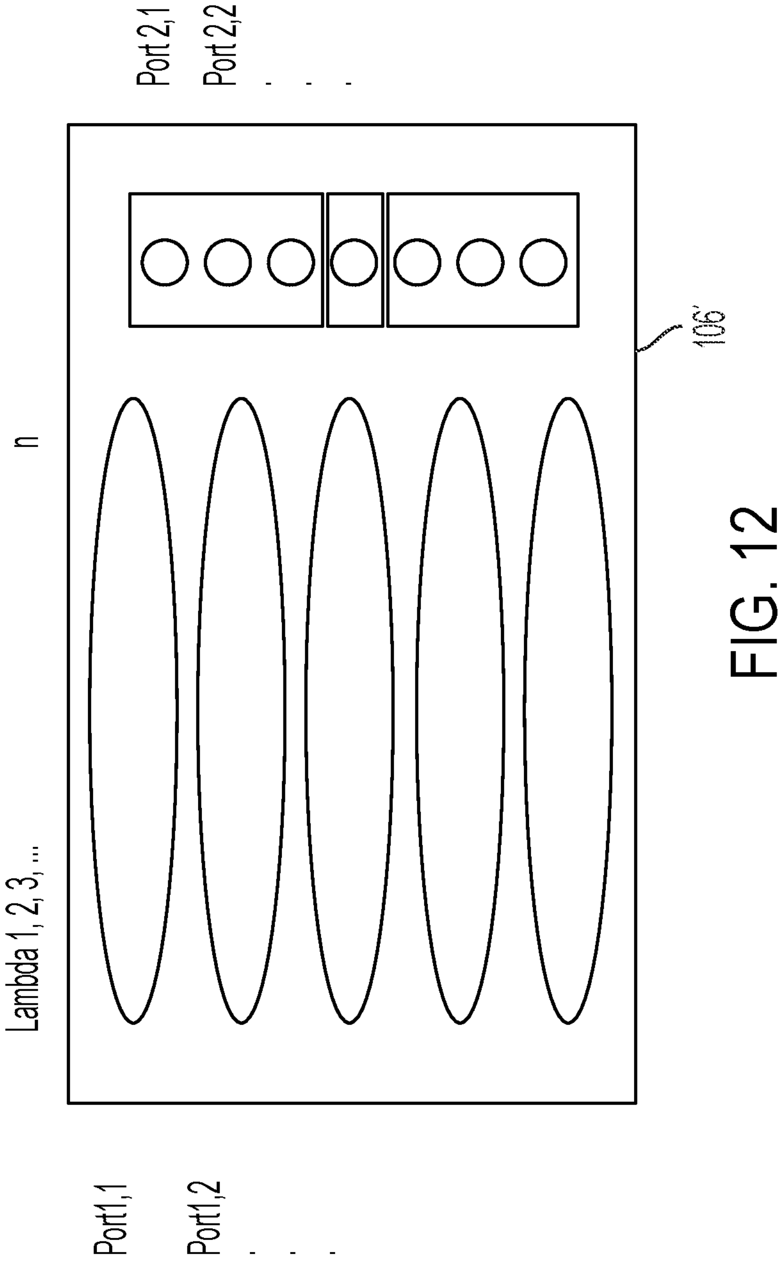
FIG. 12 is a schematic illustration of the cross-sections of the beams that hit the single switching element of FIG. 11, in accordance with an embodiment of the present invention.

FIG. 12 is a schematic illustration of the cross-sections of the beams that hit the single switching element (106') of FIG. 11.

Figure 13A:
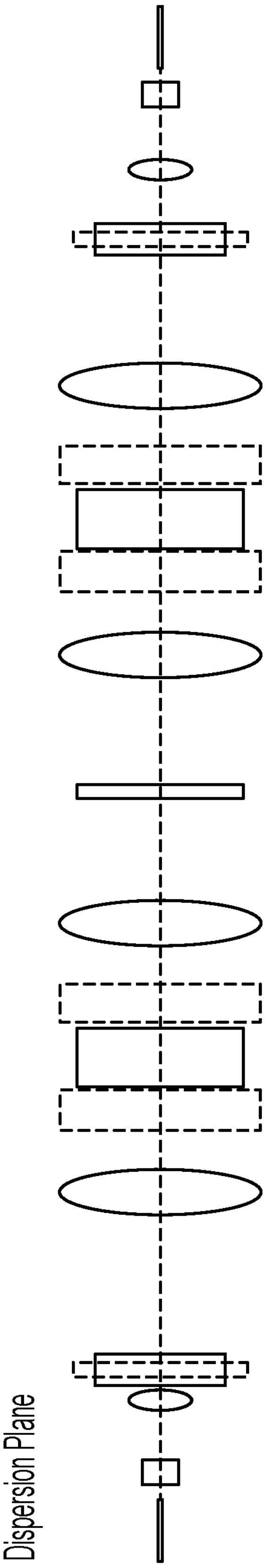
FIGS. 13A and 13B are an illustration of one example of an actual optical component arrangement of FIGS. 1A and 1B, in accordance with an embodiment of the present invention.
Figure 13B:
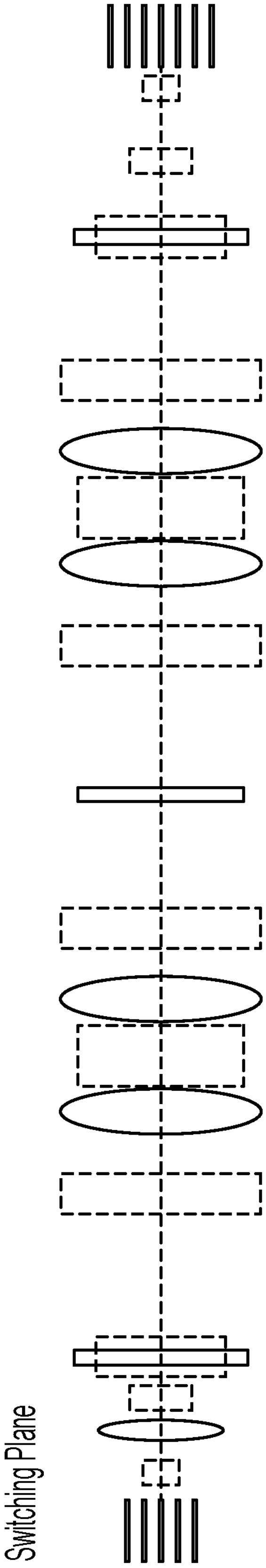

In the previous figures, some elements are intentionally omitted from the illustrated structures for the purpose of a simplified explanation of their functions, which however should not be understood as the illustrated structures include only the illustrated elements. For example, although FIG. 1A does not explicitly show the beam crossing lens (112), beam parallelizing lens (113), and port switching lens (114) as in FIG. 1B, FIG. 1A inherently includes some of these elements therein in addition to the elements explicitly shown. FIGS. 13A and 13B are an illustration of one example of an actual optical component arrangement of FIGS. 1A and 1B.

The first and second port arrays (50, 60) may be a fiber array or a collimator array. The polarization diversity element (101) may comprise a birefringent crystal and a waveplate (not shown). The beam crossing lens (112), beam parallelizing lens (113), and port switching lens (114) may be one or more lenses with power that are presented only on the switching plane. For example, double beam-parallelizing lenses (113*a*, 113*b*) and double port-switching lenses (114*a*, 114*b*) can be composed of two or more lenses with some distance therebetween to avoid overlapping with optical components on the dispersion plane. The first and second expansion lenses (103, 109) and the first and second imaging lenses (105, 107) may be a cylindrical lens with power that is presented on the dispersion plane axis. The dispersion element (108) may be a diffraction grating and a prism, which is designed to cause dispersion to occur only on the dispersion plane. The first and second switching elements (106, 115) may be composed of LCOS, MEMS, etc. The path separation element (116) may include one or more wedge prisms and may also include polarizing elements such as waveplate, PBS, etc.

Figure 14A:
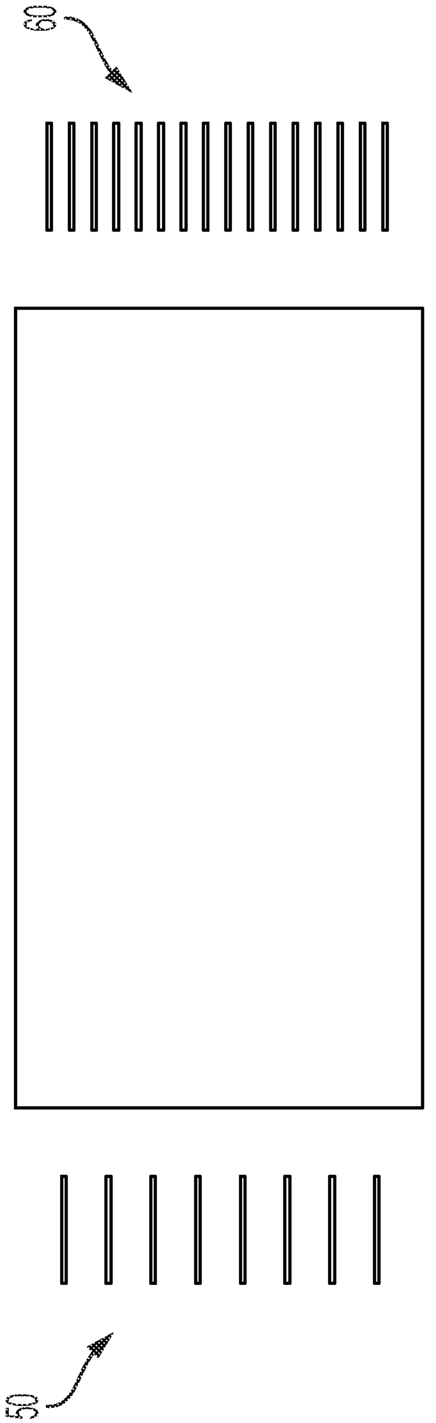
FIGS. 14A and 14B schematically illustrate that each port of a single M×N WSS (where, M, N are natural numbers) can be divided and used as a Twin M'×N' WSS (where, M', N' are natural numbers), in accordance with an embodiment of the present invention.
Figure 14B:
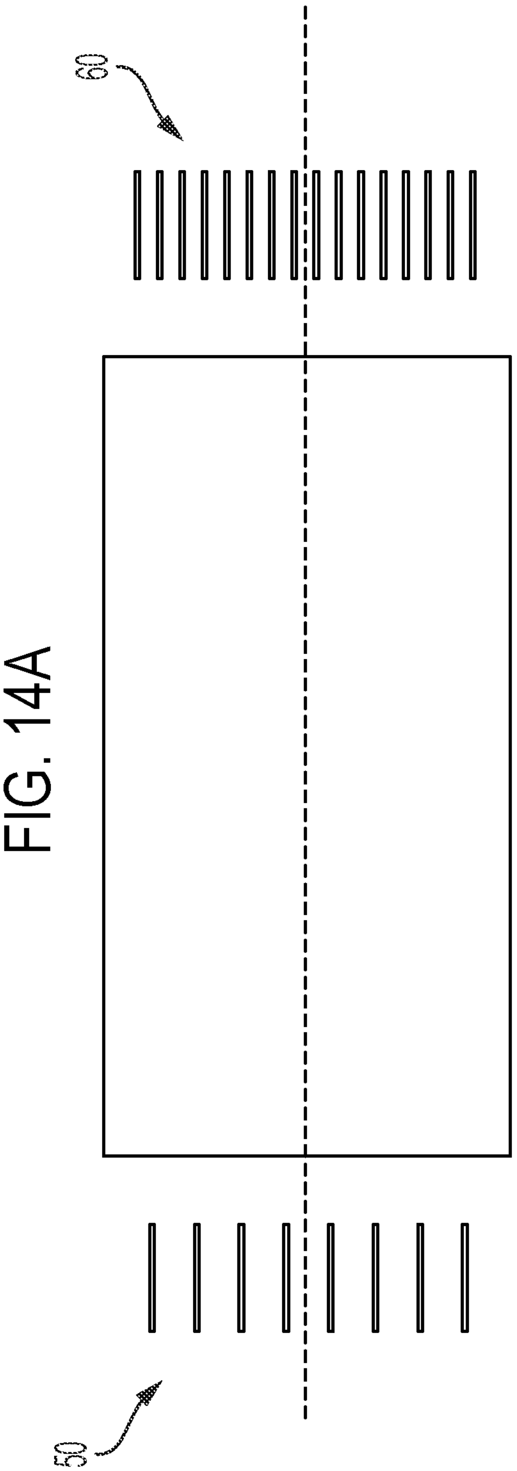

FIGS. 14A and 14B schematically illustrate that each port of a single M×N WSS (where, M, N are natural numbers) can be divided and used as a Twin M'×N' WSS (where, M', N' are natural numbers). In the embodiment of FIG. 14B, M' is a natural number smaller than M while N' is a natural number smaller than N. Since it is possible to switch ports independently from M input parts to N output ports, each port array can be divided into groups of ports with smaller port counts thereby restricting switching from one group to another group so that it can function as two independent WSSs within one module.

According to the constitution of the present invention, as discussed above, a compact structure of the WSS product is realized and the manufacturing cost is reduced, whereby it is possible to commercialize an M×N WSS with a high number of optical ports.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An M×N wavelength selective switch (WSS) for an optical communication system, comprising:

a first port array consisting of M ports for emitting/receiving beams, where M is a natural number equal to or greater than 2;

a second port array consisting of N ports for emitting/receiving beams, where N is a natural number equal to or greater than 2;

a dispersion element configured to split each beam at different angles according to different wavelength components on a dispersion plane;

an imaging lens configured to readjust and focus the wavelengths of the beams split by the dispersion element; and a unitary switching element that includes a first switching part and a second switching part, the first and second switching parts being physically combined to form one integral component, the first switching part being configured to steer the beams independently on a switching plane such that angles of the beams are controlled according to wavelengths thereof, the second switching part being configured to steer beams independently on the switching plane such that a desired port in the second port array receives a beam from a corresponding port in the first port array.

2. The M×N WSS according to claim 1, further comprising:

a polarization diversity element configured to divide the beams with random polarizations into two polarizations; and an expansion lens configured to expand a size of each of the beams.

3. The M×N WSS according to claim 2, further comprising:

a beam crossing lens configured to render the beams output therefrom parallel; and a port switching lens configured to switch paths of the beams.

4. The M×N WSS according to claim 3, further comprising:

a beam parallelizing lens which is a curved optical lens that renders the beams out therefrom parallel, wherein the first switching element is provided between the beam parallelizing lens and the beam switching lens.

5. The M×N WSS according to claim 1, wherein the unitary switching element is a Liquid Crystal on Silicon (LCoS), the first and second switching parts being arranged on a common plane.

6. The M×N WSS according to claim 1, further comprising:

a plurality of relay lenses provided between the first and second switching elements.

7. The M×N WSS according to claim 1, wherein the second switching part includes a first area where an input beam is reflected and a second area where an input beam is transmitted.

8. The M×N WSS according to claim 7, wherein the first area is located at a central position of the second switching element while the second area is located at an off-center position thereof.

9. The M×N WSS according to claim 1, further comprising:

a path separation element provided on the second switching part and functions as an expansion lens when the beams pass through the imaging lens first.

10. The M×N WSS according to claim 1, further comprising:

a path separation element provided on the second switching element and includes a plurality of wedge prisms.

11. The M×N WSS according to claim 10, wherein the path separation element includes polarization elements.

12. The M×N WSS according to claim 11, the second switching element has at least two different rubbing directions.

13. The M×N WSS according to claim 1, wherein the first and second port arrays are divided into two groups with smaller port counts, one group being functionally independent from the other group, thereby restricting optical switching from one group to another group and functioning as two independent WSSs within one module.

* * * * *